March 3, 1942.    G. E. INGRAM    2,275,079
BRAKE
Filed Feb. 15, 1941
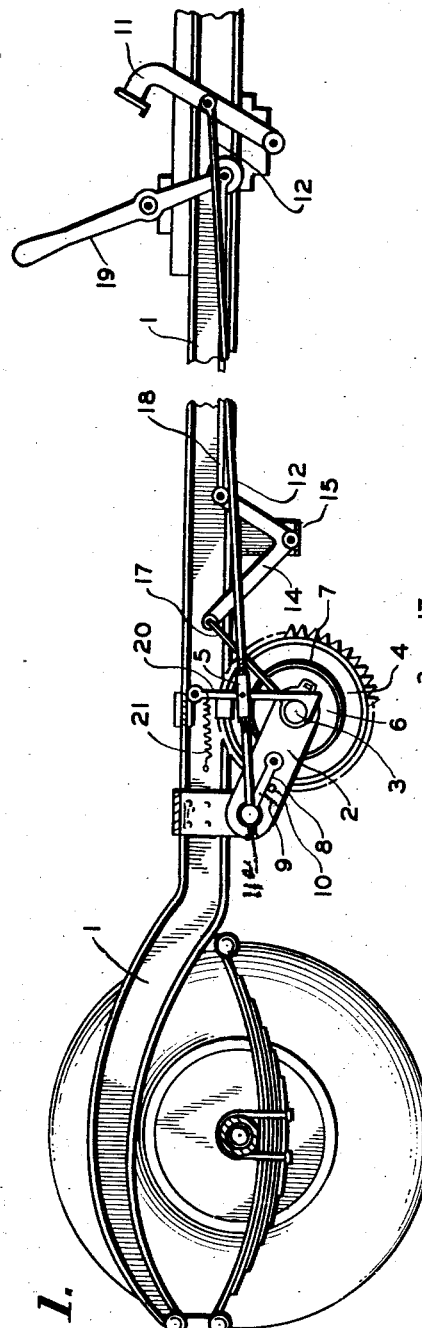
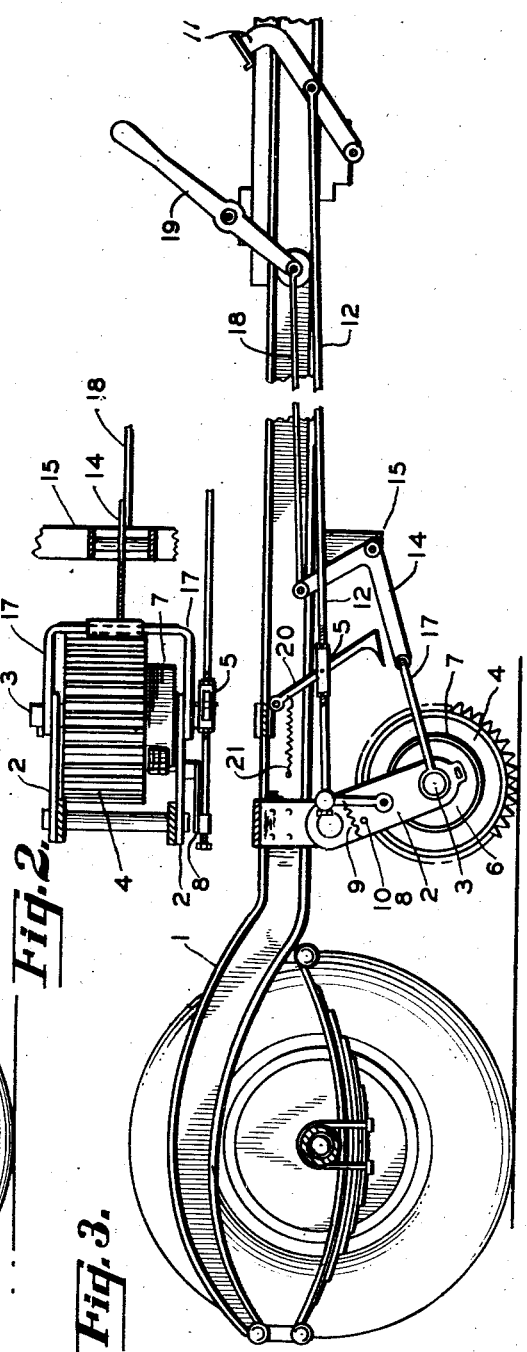
INVENTOR.
George E. Ingram
BY J. Stanley Burch, atty.

Patented Mar. 3, 1942

2,275,079

UNITED STATES PATENT OFFICE 2,275,079

BRAKE

George E. Ingram, Chicago, Ill.

Application February 15, 1941, Serial No. 379,014

5 Claims. (Cl. 188—5)

The present invention relates to improvements in a vehicle brake wherein a rotatable, serrated wheel, pivotally slung beneath the chassis of a vehicle, operates in conjunction with greatly simplified and improved means for moving said wheel into and out of contact with a road surface, and also with improved braking means for retarding rotation of said wheel to resist movement of vehicle.

The primary object of the present invention is to provide a new and improved and greatly simplified brake for rigidly gripping a road surface to resist movement of a moving vehicle thereon.

Another object is to provide a new improved device of the type set forth having improved and simplified means for effectively holding said device in an inoperative position and out of contact with a road surface, when said device is not required for use.

A further object is to provide a new and improved device of the character described having improved and greatly simplified means for removing a great portion of the wear from the regular tires of a vehicle, and, at the same time, providing a more rigid gripping engagement with a road surface.

The invention consists in the simplified construction and arrangement of parts as disclosed in the drawing forming a part of the present application, and in which—

Fig. 1 is a broken view of a portion of a vehicle, disclosing my improvement, in an inoperative position, applied thereto;

Fig. 2 is a broken plan view of the improvement; and

Fig. 3 is a view similar to Fig. 1, but showing the device in operative position.

Referring to the drawing:

The numeral 1 is used to indicate, in general, the chassis of a vehicle from which is pivotally suspended a pair of hangers 2 connected at their lower or free ends by a shaft 3 upon which is rotatably mounted a serrated wheel 4 having a brake drum 6 secured thereto in any suitable manner. A suitable brake band or braking means 7 is actuated by a lever 8 pivotally mounted on one hanger 2 and normally held in an inoperative position against a stop 10 and with its free end coaxial with the pivotal point of said hangers, by means of a spring 9, the purpose of which will hereinafter be more fully set forth. The free end of said lever 8 is also connected, by means of a connecting rod 12, to a pedal 11, preferably situated conveniently to an operator of said vehicle.

A bell crank 14 is pivotally mounted upon a suitable bracket 15 and has a bail 17 pivotally slung from one arm thereof, the free ends of said bail 17 being pivotally connected to the ends of the shaft 3 carrying the wheel 4, as disclosed in Fig. 2 of the drawing. The other arm of said bell crank 14 is connected, by means of a rod 18, to a lever 19 pivotally mounted on said chassis 1 and preferably adjacent the pedal 11, by means of which lever 19 the said bail 17 and hangers 2 and serrated wheel 4 may be moved out of contact with the road surface supporting the vehicle, as fully disclosed in Figs. 1 and 3 of the drawing.

A pair of pivotally suspended latches 20 have their lower ends arranged to engage the ends of the shaft 3 only when the same is moved upwardly to an inoperative position, to positively prevent inadvertent or accidental engagement of the serrated wheel 4 with a road surface and are connected midway to connecting rod 12 as shown in the drawing.

As a limiting stop to limit excessive downward and backward movement of the serrated wheel 4, the arm of the bell crank and bail 17, are of related lengths so that when the serrated wheel 4 is in its lowest position and in contact with a road surface, the bail 17 and the arm of the bell crank to which said bail is connected form a straight line and thus form a very effective stop.

In operation:

When it is desired to resist movement of a vehicle to which my improved device is attached, an operator presses on the pedal 11, the first movement of which releases the latches 20 against the tension of springs 21, for holding said latches in engaging relation with the ends of shaft 3, to keep the serrated wheel 4 in an inoperative position. This is accomplished by means of connecting rod 12, one end of which is connected to pedal 11 and the other end to link 5, said link being pivotally engaged with latches 20. The serrated wheel 4 is thus allowed to lower itself gravitationally until it comes in contact with the surface of the road as disclosed in Fig. 3 on the drawing. It should be noted that when the serrated wheel 4 is in the lower, or operative position, the bell crank arm and bail 17 connected thereto are in a straight line, preventing further backward movement of the serrated wheel into an ineffective position should undue stress be applied thereto.

After the wheel 4 has been moved into contact with a road surface, as above described, further pressure on the pedal 11 will cause the extension of connecting rod 12 to bring the adjustable nut 11a to actuate the lever 8 against the tension of its spring 9 and close the brake band 7 upon the drum 6 and thereby resist rotation of said serrated wheel 4, causing the serrations on the periphery thereof to engage a road surface and in turn resist and retard movement of said vehicle.

As the hangers 2 are pivotally suspended, so to speak, just in front of a perpendicular position, relatively to the vehicle, the forward movement and the weight of said vehicle, when the brake is applied, will tend to wedge or press said serrated wheel 4 into a rigid engaging relation with said road surface to a degree in direct proportion to the degree of pressure applied to the pedal 11, so that the degree of resistance to further movement of said vehicle may be controlled and regulated.

To return the brake to an inoperative position, as disclosed in Fig. 1 of the drawing, the above operation is reversed, and the serrated wheel 4 with its hangers is returned to the upper, or inoperative position by means of lever 19 and connecting rod 18.

It should be noted that when the pressure on the pedal 11 is released, the spring 9 will hold the brake-operating lever 8 against the stop 10 to normally hold the free end of said lever 8 inoperative and coaxial with the pivotal point of the hangers 2 so that the device may be raised and lowered without operation or undue straining of said lever 8 and the braking means attached thereto.

I am aware that the prior art discloses vehicle brakes having serrated wheels for engaging a road surface. I therefore do not claim such a combination broadly.

Having described my invention, I claim—

1. A vehicle brake comprising a pair of hangers pivotally suspended from the chassis of a vehicle; a shaft connecting the free ends of said hangers; a serrated wheel rotatably mounted on said shaft; a brake drum rigidly mounted on said wheel; braking means for engaging said drum; a pedal operatively connected to said shaft for moving the wheel into contact with a road surface; said pedal being connected to said braking means to operate the same to resist rotation of said wheel; a pair of latches pivotally suspended from said chassis for engaging the said shaft to normally prevent contact of said wheel with said road surface; and means operated by said pedal and connected to said latches for disengaging the same from shaft.

2. A vehicle brake comprising a pair of hangers pivotally suspended from the chassis of a vehicle; a shaft connecting the free ends of said hangers; a serrated wheel rotatably mounted on said shaft; a brake drum rigidly mounted on said wheel; braking means for engaging said drum; a lever pivotally mounted on one hanger and connected to said braking means; means for normally retaining a free end of said lever coaxial with the pivot of said hangers; latches for holding said wheel in a raised inoperative position; a pedal operatively connected to said lever by a connecting rod and operating said latches for releasing the same and permitting the wheel to gravitate downwardly and backwardly into contact with the road surface; said pedal being operatively connected to said first lever to also operate said brake means; and a second lever and connecting means for restoring said wheel to an inoperative position out of contact with a road surface.

3. The construction defined in claim 2, wherein said connecting means includes a bell-crank lever having one arm connected to said second lever and a bail connecting the lower ends of the hangers with the other arm of said bell-crank lever, said bail and said other arm of the bell-crank lever forming a straight line to act as a stop to limit the downward and backward movement of said wheel.

4. A vehicle brake comprising a rotatable ground-engaging wheel mounted to swing downwardly and rearwardly into contact with the road surface, lever operated means to swing said wheel upwardly and forwardly out of contact with the road surface, latch means for holding said wheel in raised position, braking means for said wheel, and pedal operated means operable to initially release said latch means to permit said wheel to lower into contact with the road surface and to then apply said braking means for resisting rotation of said wheel.

5. The construction defined in claim 4, wherein said lever operated means includes cooperating elements forming a straight line to limit lowering movement of said wheel.

GEORGE E. INGRAM.